March 10, 1970    J. BERCHTOLD    3,500,106
CATHODE
Filed Sept. 10, 1965    2 Sheets-Sheet 2
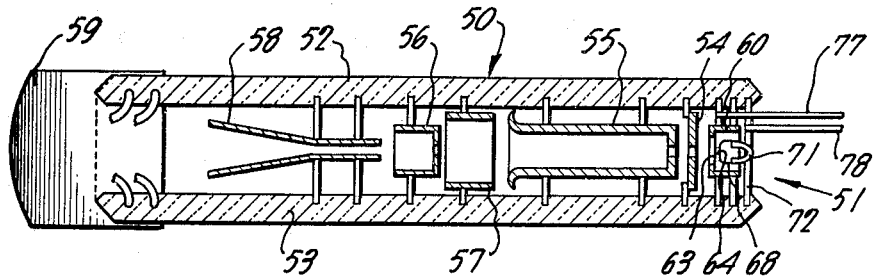
FIG_4_
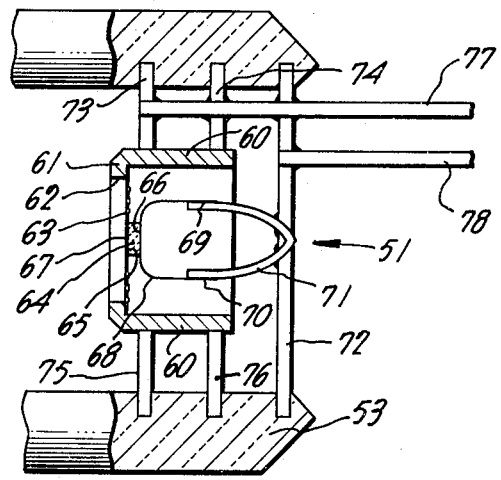
FIG_4a_
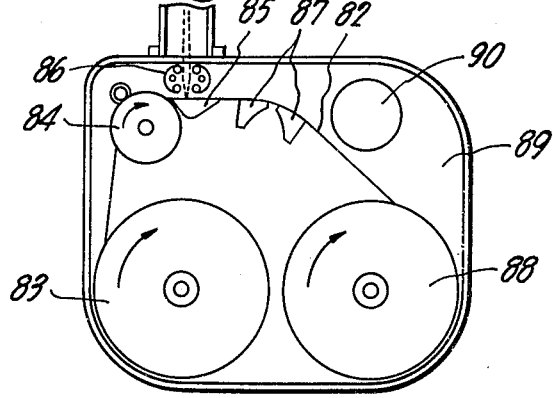
FIG_5_
INVENTOR.
JEAN BERCHTOLD
BY Robert Berliner
ATTORNEY.

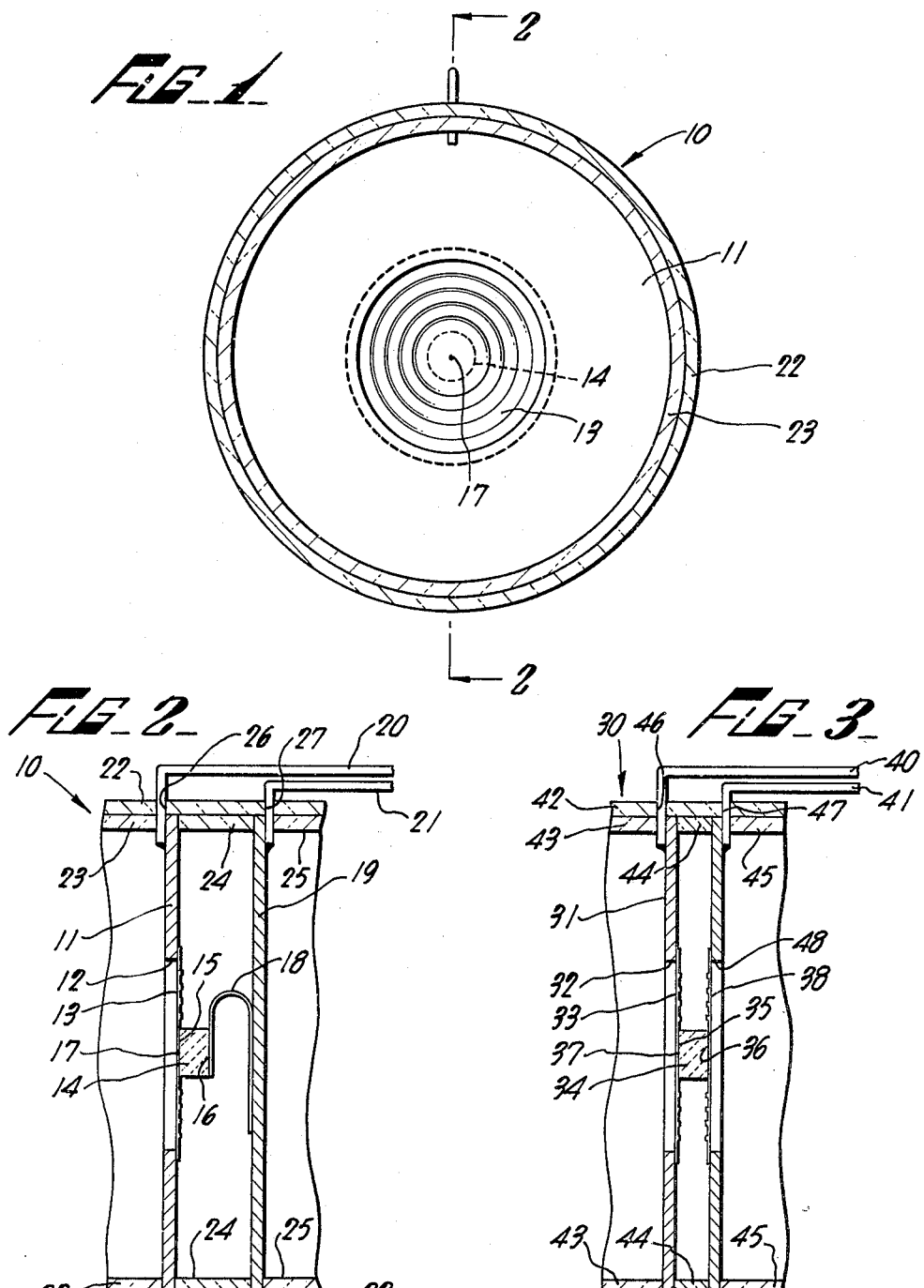

United States Patent Office 3,500,106
Patented Mar. 10, 1970

3,500,106
CATHODE
Jean Berchtold, Pasadena, Calif., assignor to Bell &
Howell Company, Chicago, Ill., a corporation of
Illinois
Filed Sept. 10, 1965, Ser. No. 487,652
Int. Cl. H01j 1/15, 19/08
U.S. Cl. 313—341                                30 Claims

ABSTRACT OF THE DISCLOSURE

A cathode constructed of an electron emitting body and a foil contiguous with and coextensive with at least a portion of surface of the emitting body, the foil having an aperture therein to expose the electron emitting material to thereby constitute an electron source.

---

This invention relates to cathodes for generating electron beams useful, for example, in electron beam recording, such as on thermoplastic film, photographic film and in ultra wide bandwidth digital or analog recorders.

An electron beam recorder apparatus consisting basically of an electron source, an electron lens system to focus an image of the electron source or of an intermediate aperture onto an electron sensitive substrate, means to deflect the beam at least along one axis and mechanical means for positioning and displacing the recording medium. Vacuum pumps, electronic circuitries and other accessories are associated with such apparatus. Acceptable media for recording are photographic film, thermoplastic tape and films making use of other effects induced by electron bombardment.

The requirements imposed on the electron beam system are highly complex, mostly mutually inter-acting and often conflicting. The usefulness of an electron beam recording system are highly dependent on the availablity of an electron source of high brightness and long life, which in addition is not overly affected by poor vacuum and which can be vented to the atmosphere.

There has been an increase in interest in applying electron beam recording for information storage in excess of the limitations set by magnetic tape recording, i.e., above about 5 megacycles/second. Requirements to record up to 100 megacycles/second are known but so far unfulfilled. The present limitation of electronic beam recording is the beam itself which should be substantially smaller and of higher current density than that obtained from available electron sources. To produce an optical density of 1.6 on Eastman Kodak electron recording film, a charge density of $10^{11}$ e./cm.$^2$ at 14 kilovolts is required; in technical units this corresponds to $0.16 \times 10^{-7}$ amp.-sec./cm.$^2$. Using intensity modulation, the peak current density required to produce this optical density is 0.32 amp./cm.$^2$ for 10 megacycles/second and 3.2 amps./cm.$^2$ for 100 megacycles/second. To record with an electron beam on General Electric thermoplastic film, charge densities of 5.6 amp./cm.$^2$. for 10 megacycles/second and 56 amp./cm.$^2$ for 100 megacycles/second are re-required. Electron beam readout of such films requires a five times higher charge density so that even for 10 megacycles/second, charge densities in excess of 30 amp./cm.$^2$ are required.

Present electron beam recording systems have serious limitations preventing their use for such requirements. The thermionic cathode commonly used for electron beam recording is of the so-called hairpin type and is employed in most ventable electron beam systems. The cathode design itself contains inherent limitations: thus the filament produces a diverging beam of noncircular symmetry due to the convex shaped apex; the magnetic field of the heater current causes a deflection and aberration of the beam; the filament has a varying potential along its length which distorts the potential field; the filament is difficult to position accurately within the electron gun; and the velocity fluctuations of emitted electrons resulting from the necessarily high temperatures of operation of tungsten tend to spread the beam. The composition of the filament itself contributes to the shortcomings of present cathodes. Most filaments are made of tungsten wire which, although relatively cheap, suffers several drawbacks including: evaporation of the metal at a fast rate at the temperature required for emission; recrystallization at high temperatures resulting in brittleness and easy breakage, ready corrosion by moisture; chemical reaction with hydrocarbons, forming carbides; and adverse reaction to traces of oxygen, decreasing emission.

Attempts to enhance the properties of tungsten for electron beam recorders and other applications by various methods have not met with substantial success. Thus, attempts to use tungsten containing a monomolecular layer of thoria in electron beam recorders has not been successful. It has been found to be very easily poisoned, as have tungsten matrices containing barium-strontium oxide or a barium-aluminate. Lanthanum hexaboride has been reported as material for a cathode, but here too the brittleness of the compound and the corrosive properties of boron, released during operation, have prevented its effective use. Thorium oxide (thoria) emitters wherein a thin layer of thoria is coated on an indirectly heated substrate of tantalum or molybdenum and directly heated sintered cathodes, have been reported. The former cathodes have a very limited supply of emissive material and a short life under adverse vacuum conditions. Additionally, the separate heater requires a temperature such that the heater is an additional source of failure. The sintered cathodes can stand greater abuse but are sensitive to ion bombardment resulting in a reduction in performance.

All the above shortcomings prevent effective use in electron beam recorders. With a tungsten filament cathode, at the required level of source brightness, the requirement to replace the cathode after a few hours of use makes such equipment more laboratory apparatus than field equipment.

Accordingly, it is an object of this invention to provide an improved electron source, or cathode, for electron beam recorders, cathode ray tubes and other uses. It is a further object to provide such cathodes that are insensitive to air while non-operative, i.e., ventable; of improved insensitivity to poor vacuum; and having the ability to deliver a current density of 10 amp./cm.$^2$ for 100 hours or more. Other objects of this invention include the provision of a cathode of small source dimensions and having a planar, or slightly concave, emitting surface, thereby providing a non-divergent or non-convergent beam; having an equipotential emission surface, thereby reducing distortion of the panel field; and having a net zero magnetic field.

The above and other objects are accomplished, in one embodiment, by providing an electron emitting body, such as thoria-rhenium cermet, and attached to the cermet, a foil of rhenium containing a small aperture exposing the cermet surface. The aperture acts as an electron source when the cermet is heated. In broader terms, I provide a cathode comprising an electron emitting body and a conductive member having contiguity with said body, said member having an aperture therein at said contiguity. The apertured conductive member, which acts as an electrode, is preferably located on a planar face of the electron emitting body. A second conductive member may be located on the body opposite the apertured member.

In one embodiment, the electron emitter comprises a body containing substantial amounts of each of a substantially non-current-conducting compound of metal, such as thoria, and a current-conducting material, such as rhenium, wherein the compound is capable of being electrolysed to yield an electron emitting metal at the surface of the emitter body. For example, thoria becomes an ionic conductor at elevated temperatures. A direct current passing through a ceramic body containing thoria has an electrolytic action. Although most of the conductivity is provided by the metal content of the body, e.g., rhenium, small amounts of thorium are released at the negative electrode of the cathode. When subjected to a heater current, the metal at the surface of the body emits electrons. Emission is restricted to a very small portion of the body surface by a perforated metal foil, which can also serve as the negative electrode. The thorium produced at the electrode-cermet interface migrates to the emission aperture, thereby enhancing electron emission. Thus, the electrolytic action of the heater current replenishes the electron emitting metal at the surface of the emitter body as the cathode is used. Perturbing magnetic fields are absent since the only magnetic fields produced are those caused by current flowing axially or symmetrically through the emitter. Cathodes of such design are able to deliver current densities of 10 amp./cm.$^2$ for 100 hours or more.

In another embodiment, the electron emitter comprises a body of current-conducting compound of a metal is capable of emitting electrons when heated and, when heated to emission temperature, forms metal at the surface of the body. For example, with lanthanum hexaboride, metal is formed and renewed by evaporation of boron.

These and other aspects of the invention will be more fully understood from the following description taken in conjunction with the accompanying drawings in which:

FIG. 1 is a front elevation view of a cathode embodiment of this invention.

FIG. 2 is a sectional side elevation view of FIG. 1 taken on line 2—2.

FIG. 3 is a sectional side elevation view of an alternate embodiment of a cathode of this invention.

FIG. 4 is a partially sectional side elevation view of an electron gun containing another alternate cathode embodiment of this invention.

FIG. 4a is an enlarged sectional side elevation view of the cathode depicted in FIG. 4.

FIG. 5 is a schematic diagram of an electron beam recorder using a cathode of this invention.

Referring to FIGS. 1 and 2, a cathode 10 is provided having a front plate 11, of stainless steel, with a diameter of about 1.25 inches and a circular central aperture 12 of about 0.5 inch. A foil 13 of rhenium, from about 0.5 to about 1.5 mils thick, is seated in the aperture 12 and is attached to the plate 11, e.g., by spot welding.

A cermet cylindrical pellet or wafer 14 having front and rear planar faces 15 and 16, respectively, has face 15 contiguous with a central portion of foil 13. Wafer 14 is composed of finally dispersed thoria and rhenium, having a resistivity of about 0.1 ohm cm. In this example, wafer 14 comprises 62.9% thoria, 33.8% rhenium and 3.2% alumina and has a diameter of about 125 mils and a width of about 80 mils. Wafer 14 is bonded to foil 13 by diffusion bonding. Foil 13 is preferably concentrically corrugated in areas out of contact with wafer 14 and plate 11.

An aperture 17 is provided in the center of foil 13 and is appreciably larger than the thickness of the foil 13, about 2–15 mils. Aperture 17 uncovers front face 15 of wafer 14 and constitutes the electron source for the cathode 10.

A strip 18 of rhenium, 1–5 mils thick and about 80 mils wide, has a portion contiguous with rear face 16 of wafer 14 and is diffusion bonded thereto. Strip 18 is spot welded in reverse, spring-like, fashion to a rear plate 19, of stainless steel and of the same outside dimensions as plate 11. Electrical connections, 20 and 21 are spot welded near the edges of plates 11 and 19, respectively. Plates 11 and 19 are held within a ceramic cylinder 22 by means of close-fitting ceramic sleeves 23, 24 and 25. Sleeve 24 is in two hemicylindrical parts. Leads 20 and 21 extend through holes 26 and 27, respectively, in cylinder 22.

Wafer 14 is a solid body and in general comprises a material selected from (1) a current-conducting compound of a metal capable of emitting electrons when subjected to high temperature, and (2) a composition comprising substantial amounts of (a) a substantially non-current-conducting compound of a metal, said metal being capable of emitting electrons when heated, and (b) a current-conducting material.

Thus, two types of materials can be used to form the electron emitting body of this invention. With both types, it is preferred that the material chosen be capable of emitting electrons when heated to a temperature of about 1400–1900° C. and yet remain solid at that temperature. Examples of current-conducting compounds of type 1 above include the borides and oxides of the alkaline-earth and rare-earth metals. The borides of the rare earths, particularly lanthanum hexaboride, are preferred type 1 materials as they yield the highest emissions.

Material of type 2 above is a cermet of a refractory compound (a) such as thoria, alumina, magnesia, zirconia, and the like, and current-conducting material (b), preferably a metal. The refractory compound best suitable for use in this invention is thoria. The metal is also refractory and preferably has a melting point of at least 200° C. and is chemically stable with compound (a) at temperatures below about 1900° C. Examples of materials that can be used as a current-conducting material (b) include rhenium, tungsten, molybdenum and alloys thereof.

When wafer 14 is of a material of type 1 above, application of a heater current through the leads 20 and 21 (and thereby through plates 11 and 19 and foil 13 and strip 18) heats the compound to emit electrons through aperture 17.

When a current is applied through a wafer 14 composed of a material of type 2 above, it is carried through the wafer by the current-conducting material (b). The current electrolyses the non-conducting compound of metal to yield electron emitting metal. When a direct current is applied such that the electrical potential of the wafer at surface 15 is negative with respect to the potential at surface 16, the electrolysis will cause formation of electron emitting metal at surface 15, thereby furnishing an electron source at aperture 17. Application of a direct current of opposite polarity, or application of an alternating current, will also cause emission of electrons since there will invariably be some amount of electron emitting metal present and there will be some replenishment due to local diffusion of metal. However, it is greatly preferred, and is a great advantage of this invention, to apply a direct current biased negative in the direction of surface 15, as this will allow immediate replenishment of electron emitting metal at surface 17 from the entire body of the wafer 14.

It is further preferred to apply a biased alternating current (i.e., with a superimposed direct current) potential through the body of wafer 14. By varying the proportion of direct to alternating current the replenishment of electron emitting metal, and thereby the electron emission of the cathode 10, can be controlled and overproduction of thorium can be prevented. Thus, application of a larger proportion of direct to alternating current would cause a greater concentration of metal at the surface and a greater activation. Decreasing the proportion of direct to alternating current would correspondingly decrease the intensity of the electron beam.

It is preferred that wafer 14 be comprised of a material of type 2 above, that is, substantial amounts of (a) a substantially non-current-conducting compound of a metal, the metal being capable of emitting electrons when heated, and (b) a current-conducting material. It is further preferred that such material contain from about 50 to about 90% of compound (a) and from about 50 to about 10% of compound (b). Further, it is desirable to add a small amount, up to about 10%, of a fluxing material, preferably a refractory metal oxide, such as alumina, zirconia and magnesia.

It is further preferred that compound (a) be thoria, as this material is particularly suitable for use in the structures of this invention. It is also preferred that material (b) be rhenium which has high mechanical strength and is stable in contact with the non-current-conducting compound (a).

It is preferred, when the wafer 14 be comprised of a type 1 compound that it contain up to about 50% of a refractory additional material which is stable in contact with the compound at temperatures below about 1900° C. Such materials include metals such as rhenium and metal oxides, such as alumina, magnesia and zirconia. When lanthanum hexaboride is the type 1 material, it is preferred that the refractory additional material be rhenium.

Wafer 14 can be prepared by subjecting the material or mixture of materials, in powdered form, to superatmospheric pressure (e.g., from about 10,000 to about 100,000 p.s.i., or more) to compress and form it into a wafer. The wafer is then sintered by being heated at from about 1200 to about 2000° C. under vacuum, to harden it. With the cermet of type 2 above, the addition of a small amount, up to about 10%, of a fluxing material, having a melting point of substantially less than that of compound (a), lowers the melting point of compound (a) and helps to produce a dense cermet body. A metal oxide as described above can be used. Addition of the fluxing material raises the resistivity of the cermet and the cermet has strongly non-ohmic properties with lowered resistance at increased voltage.

While the above method will yield workable cermets, a preferred method for type 2 wafers which will result in a greater degree of homogeneity of the material is to mix compound (a) and a reducible compound of a refractory metal (b), and heat the mixture in a reducing atmosphere, e.g., hydrogen, at a temperature sufficient to substantially reduce the compound of refractory metal (b) to refractory metal (b), without substantial reduction of the noncurrent-conducting compound (a). After reduction, the mixture is preferably reground, sifted and subjected to superatmospheric pressure, and sintered as above. Here too, it is desirable to add a small amount, up to about 10%, of a fluxing material as described above, preferably alumina. It is preferred to reduce at a temperature of from about 800 to about 1200° C.

Examples of suitable reducible compounds of (b) are ammonium perrhenate, tungsten dioxide, ammonium tungstate and ammonium molybdate.

As noted, it is preferred to use thoria and rhenium as compounds (a) and (b), respectively. In such case, it is preferred to use from about 60 to about 65% thoria and from about 30 to about 35% rhenium as ammonium perrhenate. Thus, in a preferred process about 50 to about 90% thoria (preferably from about 60 to about 65% is mixed with from about 50 to about 10% rhenium as ammonium perrhenate (preferably from about 30 to about 35%). The mixture is heated in a reducing atmosphere of hydrogen at a temperature of from about 800 to about 1200° C., for about 60 minutes. About 1 to about 10% of alumina is then added and the mixture is reground and sifted and subjected to a high pressure, e.g., about 60,000 p.s.i., for about 5 minutes, to compact the mixture into a solid body. The solid body is then heated at from about 1200 to about 2000° C. in a vacuum for a short period of time, e.g., about 5 minutes.

The fired solid material can then be cut with a diamond saw, or by other means, into the desired dimensions to yield wafers capable of emitting electrons when subjected to a temperature of about 1400–1900° C. After cutting, it is desirable to wash the wafers with an inert solvent, such a trichloroethylene, to remove residues of the cutting fluid.

Wafer 14 can be bonded to foil 13 and strip 18 by diffusion bonding. Wafer 14 is ground flat prior to bonding to produce faces 15 and 16. Foil 13, wafer 14 and strip 18 are held in their respective positions by a jig and a pressure of about 5 to about 15 lbs. is applied axially to the structure by two rods, e.g., thoria rods. An AC current (e.g., 10 amps and 4 volts), is passed through the wafer 14, in high vacuum for several minutes, raising its temperature to about 1700° C. Bonds betwen foil 13 and face 15, and strip 18 and face 16, are produced which can stand a pull of about one pound at room temperature.

Foil 13 and strip 18 are of electrically conducting refractory material, preferably having a melting point of at least 200° C. and chemically stable in contact with the wafer 14 material at temperatures below about 1900° C. It is preferred that such material be selected from rhenium, tungsten, molybdenum, alloys thereof, and tantalum carbide-coated tantalum.

When wafer 14 contains substantial amounts of thoria, any of the above materials can be used as foil 13 and strip 18. In a particular embodiment, when wafer 14 contains substantial amounts of lanthanum hexaboride, it is preferred that foil 13 and strip 18 be of rhenium or of tantalum carbide-coated tantalum. These latter materials are sufficiently stable with lanthanum hexaboride at high temperatures to afford cathodes of long life. In either case, rhenium is particularly preferred as a material for foil 13 and strip 18 as it has particularly high ductility, high strength, low thermal conductivity and is particularly stable at high temperatures with the wafer 14 material.

Emission of the cathode 10 is through aperture 17. The size of aperture 17 should be as small as possible for obtaining a fine beam but still appreciably larger than the thickness of foil 13.

Aperture 17 may be drilled mechanically in foil 13 before or after bonding to wafer 14. However, better results are achieved by electrolytic etching. This latter method is preferred as it will eliminate burrs which can cause strong potential gradients preventing a laminar flow of electrons. To electrolytically produce aperture 17, a thin wax layer (e.g., made up from equal parts of beeswax and paraffin) is coated over the foil. A small dimple is made in the wax resist at the desired location of the hole, and a drop of electrolyte is added and positioned between the foil and a stainless steel wire maintained a short distance apart. A suitable electrolyte can be composed of 2.5 parts of sodium nitrate and 20 parts of isopropyl alcohol in 40 parts of water. The isopropyl alcohol lowers the surface tension of the liquid and eases the escape of bubbles formed during etching. With foil 13 connected as the anode, holes 2–15 mils can be made in a few minutes with a current of from about 0.5 to about 5 milliamps at a potential of from about 6 to about 10 volts. Alternating current is effective for etching purposes but direct current is preferred. Apertures thus produced are free of burrs and sharp edges and are reasonably round. Foils can be thus apertured before or after bonding. The latter is preferred, to facilitate alignment of the aperture.

Foil 13 can then be placed in aperture 12 of plate 11 and spot welded along the edge of aperture 12. Similarly, strip 18 can be spot welded to plate 19. In the embodiment of FIG. 2, strip 18 is reversely bent, in a spring-like fashion, before spot welding to plate 19. Leads 20 and 21 which may be of any well known electrically-conducting material are attached by spot welding to plates 11 and 19, respectively.

Sleeve 24 can be positioned by bringing together its two hemicylindrical parts between plates 11 and 19. Sleeve 25 is positioned in cylinder 22 and the unit comprising plates 11 and 19, sleeve 24, foil 13, strip 18 and wafer 14 can be seated thereon with plate 19 abutting sleeve 25 and lead 21 extending through hole 27. Lead 20 is extended through hole 26 and sleeve 23 may be placed in cylinder 22 abutting plate 11, to form cathode 10.

In typical operation, a direct current of from 2 to 10 amps and from 1 to 8 volts and an alternating current of from 0 to about 80% of the DC value is applied to leads 20 and 21, most preferably with lead 20 biased negative.

Cathodes as described above were built and tested for emission in planar diodes at various temperatures and under varying vacuum conditions. Cermet wafers 14 comprising 62.9% thoria, 33.8% rhenium and 3.2% alumina, having dimensions of 40×50×50 mils, were used, with rhenium foils 13, having 10 mil diameter apertures 17, and rhenium strips 18. The tests were conducted under a vacuum of $5 \times 10^{-6}$ mm. Hg, with an anode potential of 2 kilovolts, a cathode-anode spacing of 2 mm. and a heater power of 2.5 volts and 7 amps and and aperture brightness temperature of the cermet at aperture 17 of 1450° C.

Emission densities of 8 amps./cm.$^2$ were maintained for 100 hours and with several units of 15 amps./cm.$^2$ for more than 100 hours, which greatly exceeds the performance of tungsten filaments. The cathodes were vented to air repeatedly without deleterious effect. Emission loss as a result of gas bursts was recovered in a matter of seconds. Cathodes which were operated at pressures of 10 microns momentarily lost emission but activation was recovered under high vacuum in 5–10 minutes.

One striking characteristic of this type of cathode is the strong dependence of heater polarity on cathode activation. With negative polarity on the apertured foil 13 side, a two to three order of magnitude larger emission is produced than with reversed polarity. With thoria cathodes as described, a stoichiometric amount of oxygen is released at the heater anode upon electrolysis of the thoria and results in a very slight increase of pressure during high current emission.

Referring now to FIG. 3, an alternate cathode 30 is provided similar to that of FIGS. 1 and 2 but wherein front and rear plates 31 and 39 both have circular central apertures 32 and 48. Front and rear foils 33 and 38, respectively, of dimensions and material similar to foil 13 of FIGS. 1 and 2, are seated in apertures 32 and 48, respectively, and are attached to plates 31 and 39, respectively, by spot welding.

A cermet cylindrical wafer 34, similar to wafer 14 of FIGS. 1 and 2, having front and rear planar faces 35 and 36, respectively, has faces 35 and 36 contiguous with central portions of foils 33 and 38, respectively, and is bonded thereto by diffusion bonding. Foils 33 and 38 are preferably concentrically corrugated in areas out of contact with wafer 34 and plates 31 and 39.

An aperture 37 is provided in the center of foil 33 and has dimensions similar to that of aperture 17 in FIGS. 1 and 2.

Leads 40 and 41 are spot welded near the edges of plates 31 and 39, respectively. Plates 31 and 39 are held within a ceramic cylinder 42 by means of closefitting ceramic sleeves 43, 44 and 45. Sleeve 44 is in two hemicylindrical parts. Leads 40 and 41 extend through holes 46 and 47, respectively, in cylinder 42.

Leads 40 and 41, plate 31, foil 33, wafer 34, cylinder 42 and sleeves 43 and 45 are of the same dimensions and material as leads 20 and 21, plate 11, foil 13, wafer 14, cylinder 22 and sleeves 23 and 25, respectively, of FIGS. 1 and 2. Plate 39 is of the same dimensions and material as plate 31 and foil 38 may be of the same dimensions and material as foil 33. Sleeve 44 is of the same diameter and material as sleeve 24 of FIG. 2 but is narrower in correspondence with the distance between plates 31 and 39. Preparation and operation of cathode 30 is similar to that of cathode 10.

Referring now to FIGS. 4 and 4a, an electron gun and associated deflection system 50 is depicted in FIG. 4 and an enlarged view of the cathode 51 portion of the gun is depicted in FIG. 4a. Aside from the cathode portion of FIG. 4a, the remainder of the electron gun is composed of conventional parts including: supporting glass rods (two of which, 52 and 53, are shown); a control electrode 54; accelerating electrodes 55 and 56; focusing electrode 57, vertical deflection plate 58; horizontal deflection plate 59; and associated electrical leads (not shown).

The cathode 51 has a cup-shaped electrically conductive support member 60, having a base 61, and a circular central aperture 62 in the base 61 of a diameter similar to that of aperture 12 of FIGS. 1 and 2. A foil 63 of dimensions and material similar to that of foil 13 of FIGS. 1 and 2 is seated in aperture 62 and is attached to base 61 by spot welding.

A cermet cylindrical wafer 64, similar to wafer 14 of FIGS. 1 and 2, having front and rear planar faces 65 and 66, respectively, has face 65 contiguous with a central portion of foil 63 and is bonded thereto by diffusion bonding. Foil 63 is preferably concentrically corrugated in areas out of contact with wafer 64 and base 61.

An aperture 67 is provided in the center of foil 63 and has dimensions similar to that of aperture 17 in FIGS. 1 and 2.

A strip 68 of rhenium, 2–3 mils thick and about 80 mils wide, having ends 69 and 70, has a central portion contiguous with rear face 66 of wafer 64 and is diffusion bonded thereto. Strip 68 is spot welded in U-shaped fashion, by ends 69 and 70, to the ends of an electrically conducting V-shaped stud 71, the apex of which is, in turn, spot welded to an electrically conductive rod 72. Rod 72 is embedded in glass rods 52 and 53.

Four pair of electrically conductive supporting rods (of which two pairs, 73, 74 and 75, 76 are shown) are welded to support member 60 and embedded in the supporting glass rods 52 and 53 (and two others not shown). Lead 77 is spot welded to rods 73 and 74 and lead 78 is spot welded to rod 72 to provide electrical contacts for the cathode 51. Operation is similar to that as described above for the embodiment in FIGS. 1 and 2.

The electron gun of FIGS. 4 and 4a can be incorporated into a cathode ray tube in a conventional manner, with a fluorescent screen as an anode therefor. Other focusing means may be used and the use of cathodes of this invention in tubes employing magnetic, electrostatic and combined methods of focusing are contemplated. The cathodes of this invention can be incorporated into any of the known tubes and electron beam devices employing cathodes, including electron microscopes, microprobe analyzers and related equipment.

The cathodes of this invention are particularly useful in ventable systems due to their insensitiveness (nonoperative sensitivity) to air and quick recovery times. Their ability to deliver very high current densities for prolonged periods of time makes the present cathodes very suitable for use in electron beam recording apparatus. Thus, another embodiment of this invention is an electron beam recorder comprising: an electron beam source as described in FIGS. 4 and 4a, containing a cathode of this invention (including the cathodes of FIGS. 1, 2 and 3 or any variation thereof); an electron sensitive substrate; means capable of focusing an image of the electron source onto the substrate; means to deflect the beam at least along one axis; means causing a displacement of the substrate with respect to the beam; and vacuum means associated with the recorder. Aside from the present cathode portion of the electron source, all of the above components, their arrangement and use are well known in the art. Various well known systems can be used and, depending on the system, various ancillary components are provided.

Referring to FIG. 5, one such system, a thermoplastic recording system using an electron beam, is diagrammatically illustrated. A thermoplastic-coated conducting film 82 from a supply roll 83 is driven at constant speed by a drive capstan 84 over a support plate 85 where it is charged by an electron beam 81. The film 82 consists of a high-melting base film coated with a transparent conducting material, with a thin film of a low-melting thermoplastic on its surface. The electron beam 81 is modulated by the signal to be recorded and applied in a television-type raster by well known methods, using intensity control, modulator, horizontal focus and deflection means (not shown). A vertical focusing cylindrical lens 86 focuses the beam 81 in a vertical direction into a row of lines on the film 82. The electron beam 81 sweeps across the film 82, providing the horizontal sweep of the raster. Vertical sweep, along the film 82, is provided by the film 82 motion.

The film passes over a pair of RF electrodes 87, and its surface is heated to the melting point of the thermoplastic. Electrostatic forces between the charges on the film and the ground plane depress the surface where the charges occur, causing deformations. As the film 82 moves on, the heat diffuses into the film base and the deformations are frozen into the surface. A small optical system (not shown) can be placed just after the RF electrodes 87 so that the recorded information can be monitored. The film is then taken up on take up roll 88. The entire device is in a chamber 89 containing a small vacuum pump 90 which maintains the chamber 89 at a pressure of about 0.1 micron.

While the present cathodes have been described with reference to thoria and rhenium as materials for their construction, any of the other materials mentioned as suitable can be used. The following examples illustrate the preparations and use of various materials noted.

EXAMPLE 1

To 99 parts by weight of lanthanum hexaboride powder are added one part by weight of alumina and the mixture is pressed to wafers of about 0.5 inch diameter and 0.1 inch thickness with a hydraulic piston at a pressure of 30,000 p.s.i. for 5 minutes. The wafers are sintered at 1500° C. for 10 minutes, cut into rectangular pieces, of 50×50×25 mils, and washed with trichloroethylene (to remove fine particles). Rhenium foils, 1.5 mils thick, and rhenium strips, 3 mils thick, are diffusion bonded to each wafer of lanthanum hexaboride, as previously described, and 15 mil diameter apertures are electrostatically etched through the center of a portion of each foil contiguous with the lanthanum hexaboride, by the method previously described. Electrically conducting leads can be spot welded to the foil and strip to provide cathodes of this invention.

EXAMPLE 2

Fifty parts by weight of thoria and 47 parts by weight of rhenium as ammonium perrhenate, in powder form, are mixed together and heated slowly to 1000° C. for 1 hour in a hydrogen atmosphere. To the resultant mixture, consisting substantially of thoria and rhenium, are added 3 parts by weight of zirconia. The mixture is reground, sifted and pressed to wafers using an isostatic press delivering 50,000 p.s.i. The wafers are then sintered at 1200° C. for 5 minutes. Foils of rhenium, 0.8 mil thick, are diffusion bonded to a flat face of each of the wafers and 4 mil diameter apertures are electrostatically etched through the center of a portion of each foil contiguous with a wafer. Two mil thick strips of molybdenum are then diffusion bonded to an opposite face of each wafer to yield cathodes of this invention.

EXAMPLE 3

Sixty parts by weight of thoria, 35 parts by weight of molybdenum and 5 parts by weight of alumina, in fine powdered form, are thoroughly mixed, ground and sifted. The mixture is subjected to hydraulic piston pressure of 10,000 p.s.i. to form solid pellets, and then sintered in vacuum at 1400° C. Foils and strips of tungsten of 1.3 and 1 mil thicknesses, respectively, are diffusion bonded to opposite faces of each pellet. Ten mil diameter apertures are drilled through the center of a portion of each foil contiguous with a pellet to expose the pellet and form cathodes of this invention.

Similar cathodes can be obtained by mixing 60 parts by weight of thoria and 35 parts by weight of molybdenum as ammonium molybdate, and then reducing the mixture to thoria and molybdenum at 1100° C. for 30 minutes under a hydrogen atmosphere. Five parts by weight of alumina can be added to the mixture thus obtained and the new mixture treated as above to form wafers and then cathodes of this invention.

EXAMPLE 4

Lanthanum hexaboride, in powdered form, and containing 10 weight percent of magnesia, finally dispersed therein, is subjected to isostatic pressure of 85,000 p.s.i. for 10 minutes to form a wafer having two planar faces. The wafer is then sintered at 1700° C. for 10 minutes. A foil and strip of tantalum carbide-coated tantalum of 0.5 and 4 mil thicknesses, respectively, are diffusion bonded to the surfaces. A 1.8 mil diameter aperture is drilled into a portion of the foil contiguous with a wafer, to a depth sufficient to expose the wafer, yielding a cathode of this invention.

EXAMPLE 5

Ninety parts by weight of zirconia and 10 parts by weight of rhenium as ammonium perrhenate are thoroughly mixed and heated at about 1200° C. for 30 minutes under a hydrogen atmosphere. The mixture is reground, sifted and pressed to wafers using isostatic pressure of 70,000 p.s.i. for 5 minutes. The wafers are then sintered at 1700° C. for 5 minutes. Foils and strips of molybdenum of 1.4 and 2.5 mil thicknesses, respectively, are diffusion bonded to opposite surfaces of each wafer. Apertures of 11.5 mil diameter are electrolytically etched through the center of a portion of each foil that is contiguous with a wafer to yield cathodes of this invention.

EXAMPLE 6

Forty parts by weight of rhenium are thoroughly mixed with 60 parts by weight of cerium hexaboride and subjected to 100,000 p.s.i. of isostatic pressure for 10 minutes to form solid wafers. The wafers are sintered at 1900° C. for 2 minutes and foils and strips of rhenium of 1.0 and 5 mil thicknesses, respectively, are diffusion bonded to opposite faces of the wafers. Five mil diameter apertures are electrolytically etched into the center of a portion of each foil contiguous with a wafer to yield cathodes of this invention.

EXAMPLE 7

A mixture of 75 parts by weight of thoria and 18 parts by weight of tungsten as tungsten dioxide are heated at 800° C. for 30 minutes in a stream of hydrogen. Two parts by weight of alumina are added to the resultant mixture which is reground, sifted and subjected, in an appropriate mold, to 65,000 p.s.i. pressure for 5 minutes, to yield solid cylindrical pellets having two planar surfaces. The pellets are sintered at 1600° C. for 3 minutes. A foil of tungsten, 1.2 mil thick, is diffusion bonded to one surface of each pellet and a 6 mil diameter aperture is drilled in a portion of each foil contiguous with the face of the pellet. A 1.2 mil thickness foil of molybdenum is diffusion bonded to the opposite planar surface of each pellet to yield cathodes of this invention.

Other examples will now be apparent to those skilled in the art and changes may be made by those skilled in the art without departing from the spirit of the invention.

I claim:

1. A cathode comprising an electron emitting body and a conductive member having at least a portion contiguous with and coextensive with at least a portion of surface of said body, said member portion having an aperture therethrough at said contiguity.

2. A cathode comprising: an electron emitting body having a face; and a conductive member, at least a portion of which is contiguous with and coextensive with at least a portion of said face; said member having an aperture through said portion.

3. A cathode comprising an electron emitter and a conductive member having at least a portion contiguous with and coextensive with at least a portion of surface of said emitter, and a small aperture through said member portion exposing said emitter and constituting an electron source of said cathode.

4. A cathode comprising a body of electron emitting material having opposite continuous surfaces between and in contact with two conductive members, one of said members having a small aperture therethrough exposing a portion of said material and constituting an electron source of said cathode.

5. A cathode comprising:
   an electron emitting body having a front planar face, and
   a first conductive member on said front face having a small aperture therethrough exposing a portion of said front face, and
   a second conductive member on said body spaced from said first conductive member.

6. A cathode comprising an electron emitting body with a front planar face having contiguity with a first conductive member, and a rear surface in contact with a first conductive member on said front face having a small aperture therethrough at said contiguity, and electrical contacts on said members.

7. A cathode comprising:
   an electron emitting body having a front planar face and a rear surface,
   a first conductive member, at least a portion of which is contiguous with said front face,
   said first member having a small aperture through said portion,
   a second conductive member in contact with said rear surface, and electrical contacts on said conductive members.

8. A cathode comprising:
   a body of electron emitting material having front and rear planar surfaces,
   a foil of conductive material, at least a portion of which is contiguous with said front surface, said foil having a small aperture through said portion,
   a conductive member contiguous with said rear surface, and
   electrical contacts on said foil and said member.

9. A cathode comprising:
   a body of electron emitting material having front and rear planar surfaces,
   a foil of conductive material, of larger surface area than said front surface, at least a portion of which is bonded to said front surface, said foil having a small aperture through said portion,
   a conductive member bonded to said rear surface, and
   electrical contacts contiguous with portions of said foil and said member and constituting supporting means therefor.

10. A cathode comprising:
    a body of electron emitting material having front and rear planar surfaces,
    a foil of conductive material of larger surface area than said front surface, a portion of which is bonded to said front surface, said foil having a small aperture through said portion,
    a front supporting member as a seat for said foil, in contact with said foil, and having an aperture therein of a size sufficient to expose the apertured portion of said foil,
    a strip of conductive material, bonded to said rear surface, and
    means for applying a heater voltage between said foil and strip.

11. A cathode comprising:
    a body of electron emitting material having front and rear planar surfaces, a foil of conductive material of larger surface area than said front surface, a portion of which is bonded to said front surface, said foil having a small aperture in said portion, a front supporting member as a seat for said foil, in contact with said foil, and having an aperture therein of a size sufficient to expose the apertured portion of said foil, said foil being concentrically corrugated in areas out of contact with said body and front supporting member, a strip of conductive material bonded to said rear surface, and means for applying a heater voltage between said foil and strip.

12. A cathode comprising:
    a conductive member; and
    a solid body comprising:
    (1) a current-conducting compound of a metal capable of emitting electrons when heated; or
    (2) a composition comprising substantial amounts of (a) a substantially non-current-conducting compound of a metal, said metal being capable of emitting electrons when heated, and (b) a current-conducting material;
    said conductive member having at least a portion thereof contiguous with and coextensive with at least a portion of said body and having an aperture in said member portion.

13. The cathode of claim 12 wherein application of a heater current across said body causes formation of electron emitting metal at the surface of said body at said aperture.

14. A cathode comprising:
    a solid body comprising a mixture of substantial amounts of:
    a substantially non-current-conducting compound of metal, said metal being capable of emitting electrons when heated to a temperature of about 1400–1900° C. and being solid at said temperature, and
    a refractory current-conducting material having a melting point of at least 2000° C. and which is chemically stable with said compound at temperatures below about 1900° C., and
    a conductive member, at least a portion of which is contiguous with and coextensive with at least a portion of a surface of said body, having a small aperture in said conductive member portion.

15. The cathode of claim 14 wherein application of a current across said body causes electrolysis of said compound to yield said metal at the surface of said body at said aperture.

16. A cathode comprising:
    a conductive member; and
    a solid body comprising:
    (1) lanthanum hexaboride; or
    (2) a composition comprising substantial amounts of (a) thoria and (b) a material selected from rhenium, tungsten, molybdenum, and alloys thereof;
    said conductive member having at least a portion thereof contiguous and coextensive with at least a portion of said body and having a small aperture in said member portion.

17. A cathode comprising:
    a solid body comprising a mixture of substantial amounts of thoria and rhenium, and a conductive member, at least a portion of which is contiguous with and coextensive with at least a portion of said body, having a small aperture in said member portion.

18. A cathode comprising:
a solid body having front and rear planar surfaces and of material comprising substantial amounts of
   (1) thoria, and
   (2) a refractory material having a melting point of at least 2000° C. and that is chemically stable with thoria at temperatures below about 1900° C.,
a foil of electrically conducting refractory material, at least a portion of which is contiguous with said front surface, said foil having a small aperture in said portion,
a member of electrically conducting refractory material contiguous with said rear surface,
said foil and said member materials having melting points of at least 2000° C. and being chemically stable in contact with thoria at temperatures below about 1900° C., and
electrical contacts on said foil and member.

19. The cathode of claim 18 wherein said refractory material, in all instances, is selected from rhenium, tungsten, molybdenum and alloys thereof.

20. A cathode comprising:
a solid body having front and rear planar surfaces and of material comprising lanthanum hexaboride,
a foil of electrically conducting refractory material, at least a portion of which is contiguous with said front surface, said foil having a small aperture in said portion,
a member of electrically conducting refractory material contiguous with said rear surface,
said foil and said member materials having melting points of at least 2000° C. and being chemically stable in contact with lanthanum hexaboride at temperatures below about 1900° C., and
electrical contacts on said foil and member.

21. The cathode of claim 20 wherein said refractory material, in both instances, is selected from rhenium and tantalum carbide-coated tantalum.

22. A cathode comprising:
a wafer of solid compressed material comprising from about 50 to about 90% thoria and from about 50 to about 10% rhenium, said wafer having front and rear planar surfaces,
a foil of metal selected from rhenium, tungsten, molybdenum and alloys thereof, of larger surface area than said front surface, a portion of which is contiguous with said front surface, said foil having a small aperture in said portion,
a metal member selected from rhenium, tungsten, molybdenum, alloys thereof, and tantalum carbide-coated tantalum, contiguous with said rear surface, and
electrical contacts on said foil and member.

23. The cathode of claim 22 wherein said aperture has a diameter of from about 2 to about 15 mils.

24. The cathode of claim 23 wherein said foil has a thickness of about 0.5 to about 1.5 microns.

25. In an electron beam device having an evacuated chamber; an anode in said chamber; and a cathode; the improvement wherein said cathode comprises an electron emitting body and a conductive member having at least a portion contiguous with and coextensive with at least a portion of surface of said body, said member portion having an aperture therethrough at said contiguity.

26. In an electron beam device having an evacuated chamber; an anode in said chamber; and a cathode; the improvement wherein said cathode comprises:
a conductive member; and
a solid body comprising:
   (1) a current-conducting compound of a metal capable of emitting electrons when subjected to a heater current; or
   (2) a composition comprising substantial amounts of (a) a substantially non-current-conducting compound of a metal, said metal being capable of emitting electrons when heated, and (b) a current-conducting material;
said conductive member having at least a portion thereof contiguous with and coextensive with at least a portion of said body and having an aperture in said member portion.

27. In an electron beam device having an evacuated chamber: an anode in said chamber; and a cathode; the improvement wherein said cathode comprises:
a wafer of solid compressed material comprising from about 50 to about 90% thoria and from about 50 to about 10% rhenium, said wafer having front and rear planar surfaces, a foil of metal selected from rhenium, tungsten, molybdenum, alloys thereof, and tantalum carbide-coated tantalum, of larger surface area than said front surface, contiguous with a portion of said front surface, said foil having a small aperture in said portion,
a metal member selected from rhenium, tungsten, molybdenum and alloys thereof, contiguous with said rear surface, and electrical contacts on said foil and member.

28. In an electron beam recorder having: an electron beam source; an electron sensitive substrate; means capable of focusing an image of said electron source onto said substrate; means to deflect said beam at least along one axis; means causing a displacement of said substrate with respect to said beam; and vacuum means associated with said recorder; the improvement wherein:
said electron beam source comprises: an electron emitting body, and
a conductive member having at least a portion contiguous with and coextensive with at least a portion of surface of said body, said member portion having an aperture therethrough at said contiguity.

29. In an electron beam recorder having:
an electron beam source; an electron sensitive substrate; means capable of focusing an image of said electron source onto said substrate; means to deflect said beam at least along one axis; means causing a displacement of said substrate with respect to said beam; and vacuum means associated with said recorder; the improvement wherein:
said electron beam source comprises: a conductive member; and a solid body comprising:
   (1) a current-conducting compound of a metal capable of emitting electrons when subjected to a heater current; or
   (2) a composition comprising substantial amounts of (a) a substantially non-current-conducting compound of a metal, said metal being capable of emitting electrons when heated, and (b) a current-conducting material;
said conductive member having at least a portion thereof contiguous with and coextensive with at least a portion of said body and having an aperture in said member portion.

30. In an electron beam recorder having:
an electron beam source; an electron sensitive substrate; means capable of focusing an image of said electron source onto said substrate; means to deflect said beam at least along one axis; means causing a displacement of said substrate with respect to said beam; and vacuum means associated with said recorder; the improvement wherein:
said electron beam source comprises:
a wafer of solid compressed material comprising from about 50 to about 90% thoria and from about 50 to about 10% rhenium, said wafer having front and rear planar surfaces, a foil of metal selected from rhenium, tungsten, molybdenum and alloys thereof, of larger surface area than said front surface, contiguous with a portion of said front surface, said foil having a small aperture in said portion, a metal member selected from rhenium, tungsten, molybdenum, alloys thereof, and tantalum carbide-coated tantalum, contiguous with said rear surface, and electrical contacts on said foil and member.

References Cited

UNITED STATES PATENTS

| | | | |
|---|---|---|---|
| 2,468,129 | 4/1949 | Spencer | 313—341 |
| 2,847,328 | 8/1958 | Cline | 313—346 |
| 2,855,536 | 10/1958 | Wyler | 313—346 |
| 2,878,409 | 3/1959 | Levi | 313—346 |
| 3,114,070 | 12/1963 | Stratton | 313—346 |
| 3,119,947 | 1/1964 | Goetzberger | 313—346 |
| 3,281,858 | 10/1966 | Schwertz | 346—74 |
| 3,312,856 | 4/1967 | Lafferty | 313—346 |

BERNARD KONICK, Primary Examiner

ROBERT S. TUPPER, Assistant Examiner

U.S. Cl. X.R.

29—25.14, 25.15, 25.18; 252—512, 515, 521; 313—270, 337; 346—74